Nov. 16, 1965  J. E. STRYKER  3,217,507
REFRIGERATION METHOD AND APPARATUS
Filed June 18, 1963
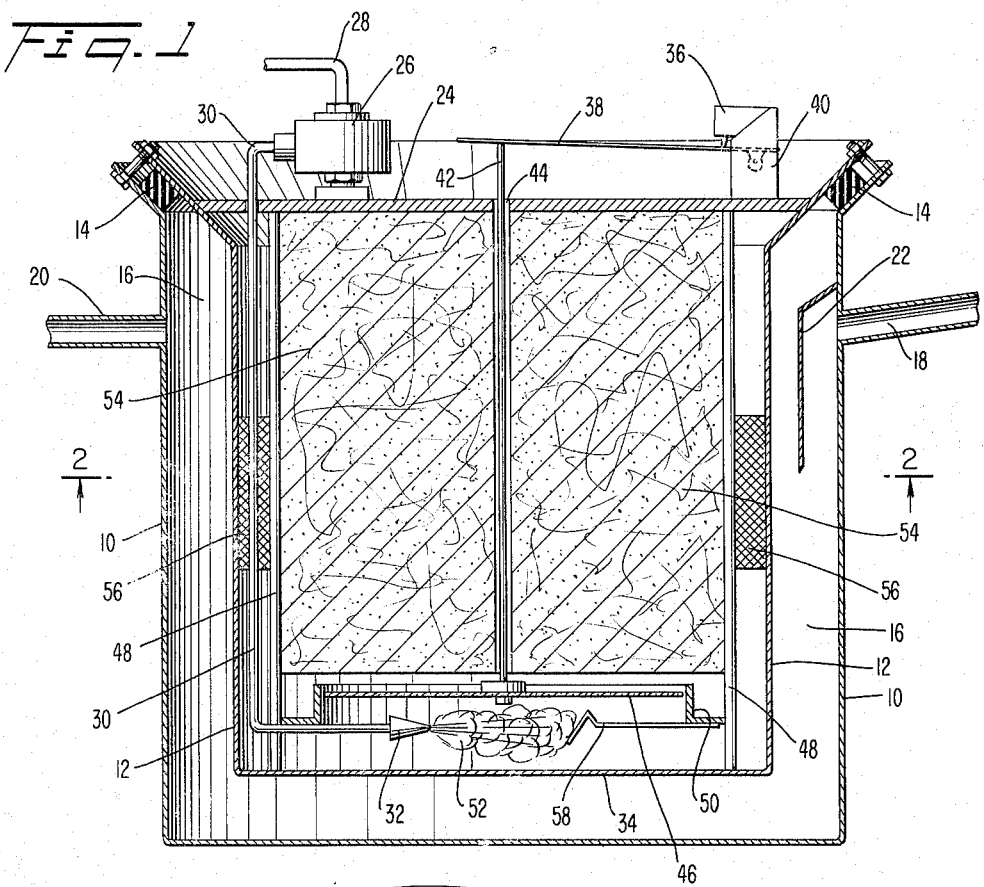
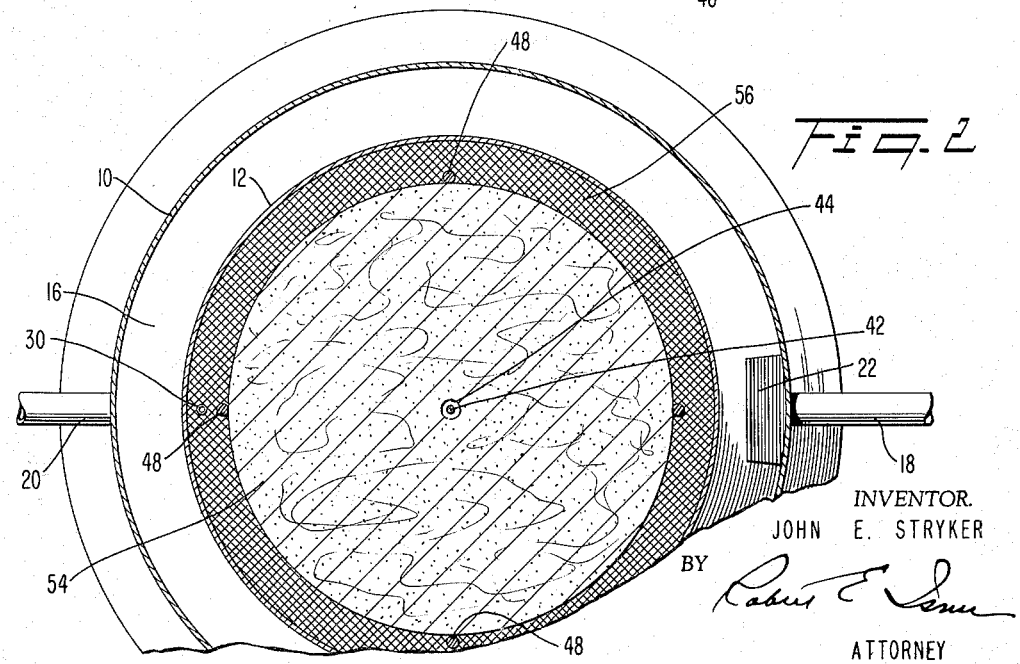
INVENTOR.
JOHN E. STRYKER
BY
ATTORNEY

United States Patent Office 3,217,507
Patented Nov. 16, 1965

3,217,507
REFRIGERATION METHOD AND APPARATUS
John E. Stryker, Bloomfield, N.J., assignor, by mesne assignments, to Associated Testing Laboratories, Inc., a corporation of New Jersey
Filed June 18, 1963, Ser. No. 288,799
2 Claims. (Cl. 62—165)

This invention relates to a method and apparatus for automatically controlling temperature by regulation of liquid carbon dioxide flow in response to variations in refrigeration load requirements, and particularly to freeze drying processes and apparatus embodying the same.

Freeze drying, which broadly involves the removal of moisture from a frozen specimen by sublimation, is finding increasing utilization in the biological, pharmaceutical and food processing fields due, at least in part, to its avoidance of biological deterioration, ready adaptability to dehydration of heat sensitive materials and to the desirable properties of the dehydrated product that results therefrom.

Among the essentials of conventional freeze drying systems is the exposure of a frozen specimen to high vacuum conditions and the inclusion of a low temperature condenser or collector surface within the high vacuum system upon which the sublimed vapor phase moisture removed from the frozen specimen may be condensed or collected. Present day techniques for maintaining a low temperature condenser or collector surface conventionally include the use of mechanical refrigeration systems or the use of Dry Ice in conjunction with a bath of a low freezing point liquid such as acetone or various alcohols. Mechanical refrigeration systems of the type required to maintain temperatures of the extremely low order of magnitude herein of concern are generally of appreciable size and relatively expensive. Dry Ice utilization is, at best, attended by considerable inconvenience requiring synchronization of Dry Ice delivery with intended use thereof, the necessity of crushing or breaking it up to sizes suitable for use, difficulties of storage and loss and the ever attendant hazard of the use of fluid baths of highly volatile and combustible liquids.

More recent developments in this field have included the direct discharge and expansion of liquid carbon dioxide below the surface of the bath fluid with the attendant formation therein of carbon dioxide snow and gas. Although this expedient has certain advantages over the conventional practices as set forth above, the refrigerating effect obtainable is appreciably less than that of Dry Ice, the degree of temperature control obtainable is somewhat limited due to the necessity of having the stop valve in the liquid carbon dioxide line responsive to an immersion thermostat in the bath fluid and, additionally, such expedient requires the presence of the bath fluids with their ever attendant hazards as mentioned above.

In addition to the above the introduction of liquid carbon dioxide into the bath creates excessive turbulence and attendant spillage, all of which contribute to rapid vaporization and consequent loss of solvent.

This invention, in its broad aspects, may be briefly described as a new method and apparatus for regulating the flow of liquid carbon dioxide and for controlling temperature in such a manner as to automatically compensate for variations in refrigeration load requirements. More specifically, the subject invention includes the maintenance in a freeze dryer and within predetermined limits of quantities of solid phase carbon dioxide snow by continuous sensing of the physical presence of such quantities and the effecting of automatic replenishment thereof from a supply of liquid carbon dioxide whenever said quantity falls below a predetermined limit.

In comparison to conventional practices which are merely directed to temperature control and achieve this by either on-off, proportional or other types of modulation in response to temperature variation, the subject invention utilizes the inherently constant temperature of a subliming solid to eliminate the temperature variations of a refrigeration source, and through automatic retention of fixed quantities of such solid the refrigerating effect is essentially of constant value rather than the intermittent effect normally associated with cooling by conventional methods responsive to temperature variation.

Other advantages attendant practice of the subject invention are a permitted simplicity of freeze dryer design providing not only a relatively low cost of manufacture but an economy of operation characterized by extended periods of operation without undue maintenance and highly efficient utilization of the heat removal capacity of the liquefied carbon dioxide. Still another advantage of the subject invention is its permitted utilization without limitation as to size of installation.

As will be apparent from the foregoing and from what hereinafter follows, the subject invention is of particular utility in conjunction with freeze drying systems employing liquid carbon dioxide, but will also be of appreciable, if not even greater, utility in conjunction with other expendable liquid refrigerants of appropriate physical characteristics and in applications other than freeze drying.

Other objects and advantages of the subject invention will be apparent from the following portions of the specification and claims and from the accompanying drawings which show, by way of illustrative example, the principles underlying the invention as the same are incorporated in a presently preferred embodiment of a freeze drying unit.

Referring to the drawings:

FIGURE 1 is a schematic vertical section of the operative essentials of a relatively small freeze dryer incorporating the principles of this invention;

FIGURE 2 is a horizontal section on the line 2—2 of FIGURE 1.

Referring to the drawings and particularly to FIGURES 1 and 2 which illustrate the incorporation of the subject invention in a small freeze drying unit adapted for laboratory use, there is provided a vessel formed of an outer shell 10 and a concentric inner shell 12 disposed in spaced relation therewithin. Both of said shells can conveniently be of cylindrical configuration and of heavy wall construction and cooperatively define a high vacuum chamber 16 disposed therebetween. As illustrated, the upper ends of the shells 10 and 12 may be suitably flanged so as to provide abutting support surfaces incorporating a sealing ring 14 therebetween.

The outer shell 10 is provided with a first conduit 18 connectable to a frozen specimen (not shown) and, disposed remote therefrom, a second conduit 20 connectable to a source of high vacuum (not shown) so as to permit exposure of said frozen sample to the necessary high vacuum conditions. Preferably, a baffle member 22 is disposed adjacent to the terminus of the first conduit 18 so as to direct and distribute an even flow of the sublimed vapor removed from the frozen sample downwardly and around the surface of the inner shell 12 which serves as the low temperature collector or condenser surface within the high vacuum system.

Disposed within the inner chamber 12 and support by the upper flange thereof is a control unit support frame 24. Mounted on the support frame 24 is a solenoid actuated valve assembly generally designated 26 of conventional construction as manufactured by the Automatic Switch Co. of Florham Park, New Jersey, disposed intermediate an inlet conduit 28 connectable to a source of liquid carbon dioxide (not shown) and an outlet conduit 30 terminating in a nozzle member 32 positioned adjacent the base portion 34 of the inner shell 12. Also mounted on the support frame 24 is a bracket mounted limit switch, generally designated 36 suitably of the type manufactured by the Microswitch Division of Minneapolis Honeywell Corp. with an extended lever arm 38. As illustrated, the arm 38 of the limit switch 36 has its free end adapted to be displaced by the upper end of a push rod 42 which extends through a suitable aperture 44 in the frame 24. The upper end of the push rod and abutting portion of the actuating arm 38 is preferably provided with a suitable fine adjustment screw and locking assembly to permit vernier adjustment of limit switch actuation in response to push rod displacement as will be hereinafter described. The push rod 42 dependently terminates in a horizontally disposed disc-like displaceable diaphragm member 46 disposed adjacent to and in spaced relation with the base 34 of the inner shell 12.

Dependent from the support frame 24 and disposed in spaced relation to the inner shell 12 are a plurality of supporting straps or bars 48 sized to contact the base 34 of the inner shell 12, and thereby partially support the frame 24 in such manner as to permit the escape of gaseous carbon dioxide between the frame periphery and the abutting portions of the inner shell flange. Connected to the lower portion of the straps 48 is a flanged mounting ring 50 whose terminus serves to encircle the periphery of the diaphragm 46 and thereby serves to define, in conjunction with the aforementioned displaceable diaphragm 46 and adjacent portions of the base 34 of the inner shell 12, a carbon dioxide snow receiving chamber 52 of variable volume and having the aforesaid nozzle 32 disposed therein.

If desired, the chamber 52 may include a deflector plate assembly 58 positioned in predetermined relation to the nozzle 32 to localize the build-up of solid carbon dioxide snow adjacent the movable diaphragm 46.

Surrounding the push rod 42 over the major portion of its length and substantially filling the inner shell 12 is a packing of heat insulating material 54, suitably a urethane foam, which serves to localize the desired temperature effect and minimize consumption of carbon dioxide. Disposed in concentric relation about the packing 54 and filling the space intermediate said packing and the inner wall of shell 12 is a ring or band of air filter material 56 which serves to prevent any carbon dioxide crystals from being carried out of the unit entrained with carbon dioxide gas.

In operation of the illustrated unit, the diaphragm 46 will be in its lowermost position at the initiation of operations and the limit switch 36 will be biased so as to open the solenoid actuated valve assembly 26 to permit flow of liquid carbon dioxide from the source thereof through the conduits 28 and 30 and to the nozzle 32. The passage of the carbon dioxide through the nozzle 32 will result in the formation of carbon dioxide snow and the accumulation thereof within the chamber 52. Such snow formation will continue, being suitably localized by the presence of the baffle member 58, until the accumulation thereof displaces the movable diaphragm 46 in the upward direction. When the diaphragm 46 has been displaced a predetermined distance, the accompanying pivotal displacement of the switch actuating arm 38 will effect actuation of switch 36, which will in turn deenergize the solenoid actuated valve 26 to shut off the flow of liquid carbon dioxide. The resulting presence of the accumulated carbon dioxide snow in the chamber 52, at its inherently constant temperature of $-109.3°$ F., will result in a lowering of the temperature of the inner shell or the major portion thereof to such value.

After the temperature of the inner shell 12 has been suitably reduced, the frozen specimen may be suitably connected to the first conduit 18 of the high vacuum chamber 16 and the second conduit 20 is connected to a suitable source of high vacuum. As is well known, the application of high vacuum will serve to effect sublimation and removal of moisture contained in the frozen specimen characteristic of freeze-drying operations. Such moisture, in the vapor phase, will enter the high vacuum chamber 16 and will be deflected by the baffle 22 in such manner as to obtain a relatively even distribution of vapor flow around the inner shell 12. Additionally, said baffle 22 functions to minimize the possibility of ice crystals entering the vacuum pump, although auxiliary means may be provided, if desired, in association with the vacuum pump to prevent such occurrence.

As will now be apparent, the inner shell 12 serves as the low temperature condenser or collector surface within the high vacuum system upon which the sublimed vapor phase moisture removed from the frozen specimen is condensed or collected. In the subject unit, the temperature of the inner shell 12 is maintained effectively constant by the physical presence of predetermined quantities of carbon dioxide snow within the chamber 52, which as indicated earlier has an inherent constant temperature of $-109.3°$ F. Such temperature will be maintained constant as the carbon dioxide snow in the chamber 52 sublimes and decreases in mass. As sublimation of the carbon dioxide snow proceeds, carbon dioxide gas will flow upward through the air filter strip 56 additionally cooling the inner shell 12 past the frame support 24 and outwardly to the atmosphere and the mass of carbon dioxide snow within the chamber 52 will diminish. As the mass of carbon dioxide snow within the chamber 52 diminishes, the movable diaphragm 46, being supported thereby will gradually descend. At a predetermined point in its descent, the limit switch 36 will be reactuated to open the solenoid actuated valve 26 to permit further flow of liquid carbon dioxide and the formation and deposition of additional carbon dioxide snow within the chamber 52 until concomitant upward placement of the diaphragm 46 effected thereby again reactuates switch 36 to halt the flow of liquid carbon dioxide.

The subject method and apparatus thus provides for the continual presence of predetermined amounts of carbon dioxide snow in physical contact with the inner shell 12 and thereby utilizes the inherently constant temperature of the subliming solid, i.e., carbon dioxide to eliminate temperature variations in the refrigeration source. The described method and apparatus is thus also directly responsive to refrigeration load requirements and not to temperature and any increase or decrease in the load will be reflected, under constant temperature conditions, in the quantity of liquid carbon dioxide used.

In accordance with the provisions of the patent statutes, I have described the subject invention as the same would be embodied in a freeze dryer unit, such being a presently preferred embodiment thereof, but it should clearly be understood that the principles of the invention will be of utility in other embodiments and applications.

Having thus described my invention, I claim:

1. In a freeze dryer, a condenser surface shaped to at least partially define a receptacle, means for expanding a liquid refrigerant into said receptacle to form a sublimable solid phase component thereof therein, valve means disposed intermediate a source of said liquid refrigerant and said receptacle to control the flow thereof and means associated with said receptacle and including a movable member positionably responsive to the quantity of said solid phase component of said refrigerant disposed in said receptacle for actuating said valve means to control the flow of said liquid phase refrigerant from said source thereof to said receptacle.

2. In a freeze dryer, a condenser surface shaped to at least partly define a receptacle subject to atmospheric pressure, means for expanding a liquid refrigerant into said receptacle to form a sublimable solid phase component thereof therein, valve means disposed intermediate a source of said liquid refrigerant and said receptacle to control the flow thereof, a movable member disposed within said receptacle and positionably responsive to the quantity of said solid phase component of said refrigerant disposed within said receptacle and means responsive to first and second positions of said movable member for selectively opening and closing said valve means to control the flow of said liquid phase refrigerant from said source thereof to said receptacle for continual maintenance of the presence of the solid phase component of said refrigerant within said receptacle.

References Cited by the Examiner
UNITED STATES PATENTS

| | | | |
|---|---|---|---|
| 1,847,844 | 3/1932 | McLaren | 62—10 |
| 1,981,830 | 11/1934 | Bright | 62—10 |
| 2,435,854 | 2/1948 | Taylor | 62—384 |
| 2,565,722 | 8/1951 | Dawley et al. | |
| 2,951,351 | 9/1960 | Snelling | 62—64 |
| 3,114,247 | 12/1963 | MacLeah | 62—55 |

ROBERT A. O'LEARY, *Primary Examiner.*